Patented Apr. 3, 1923.

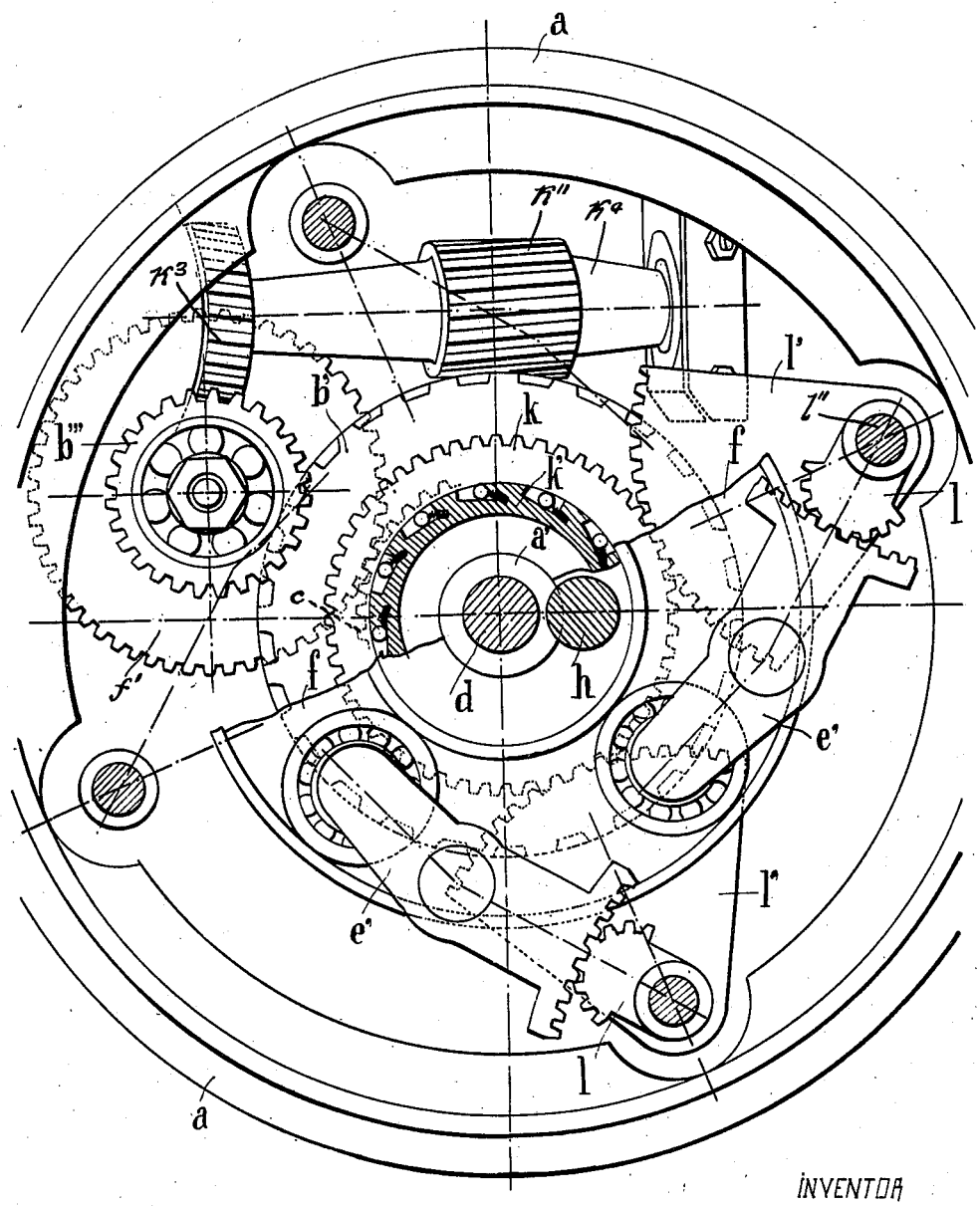

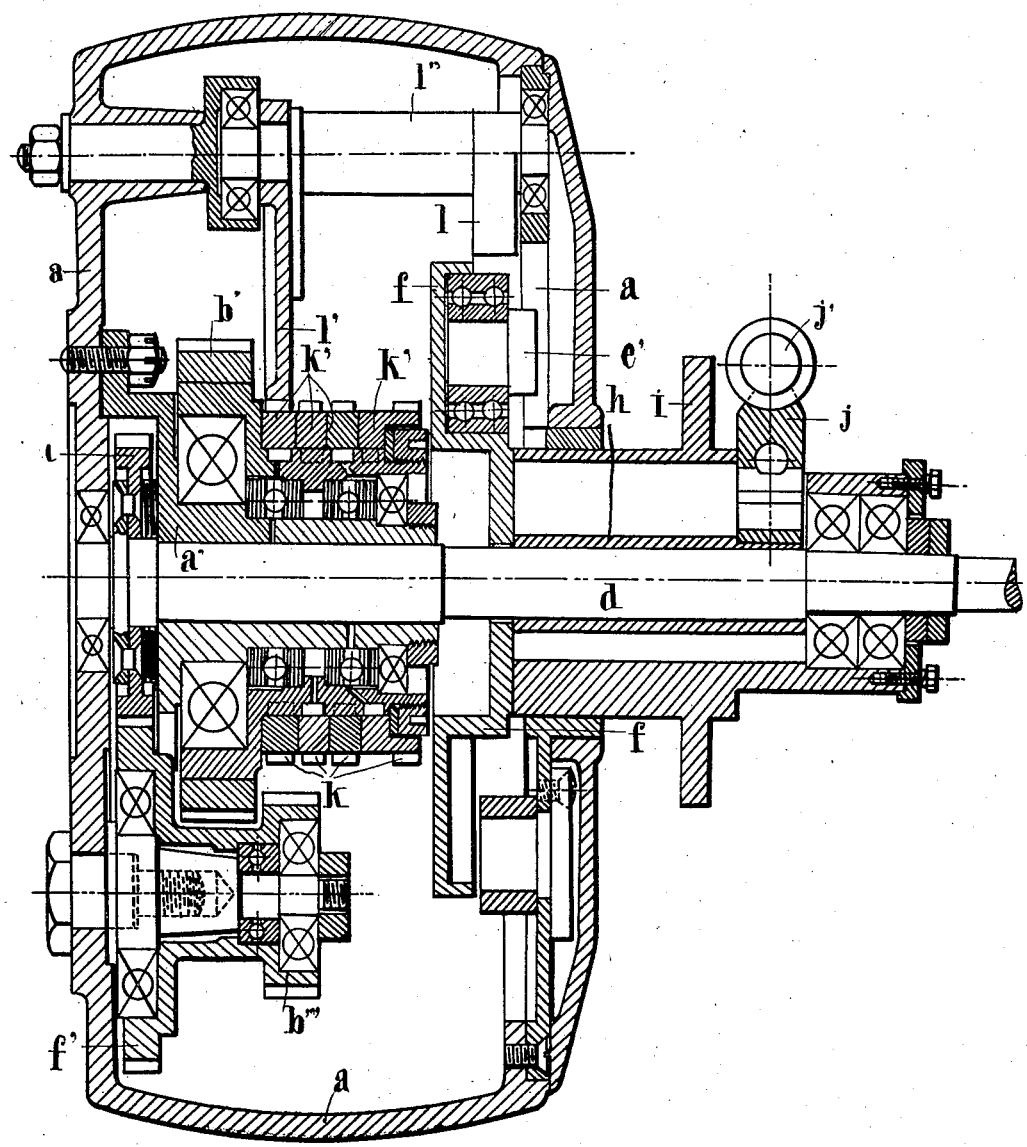

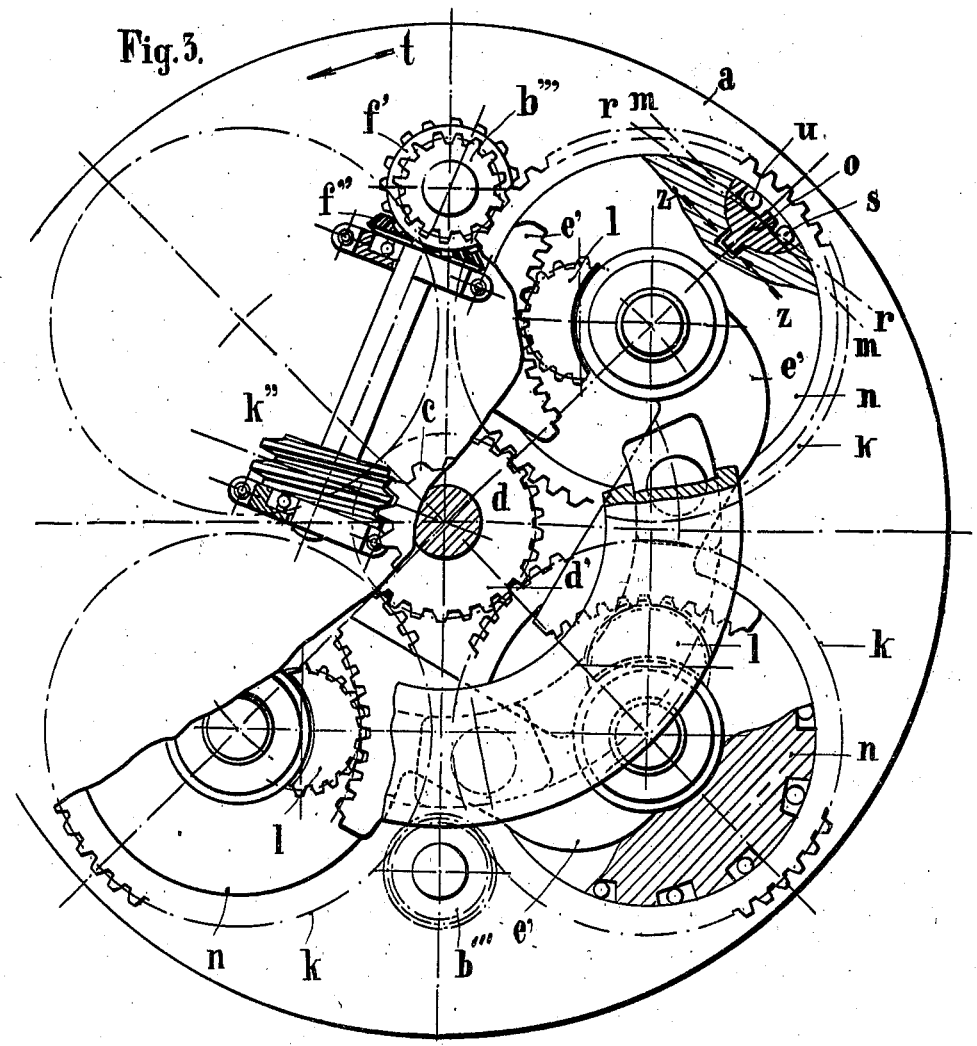

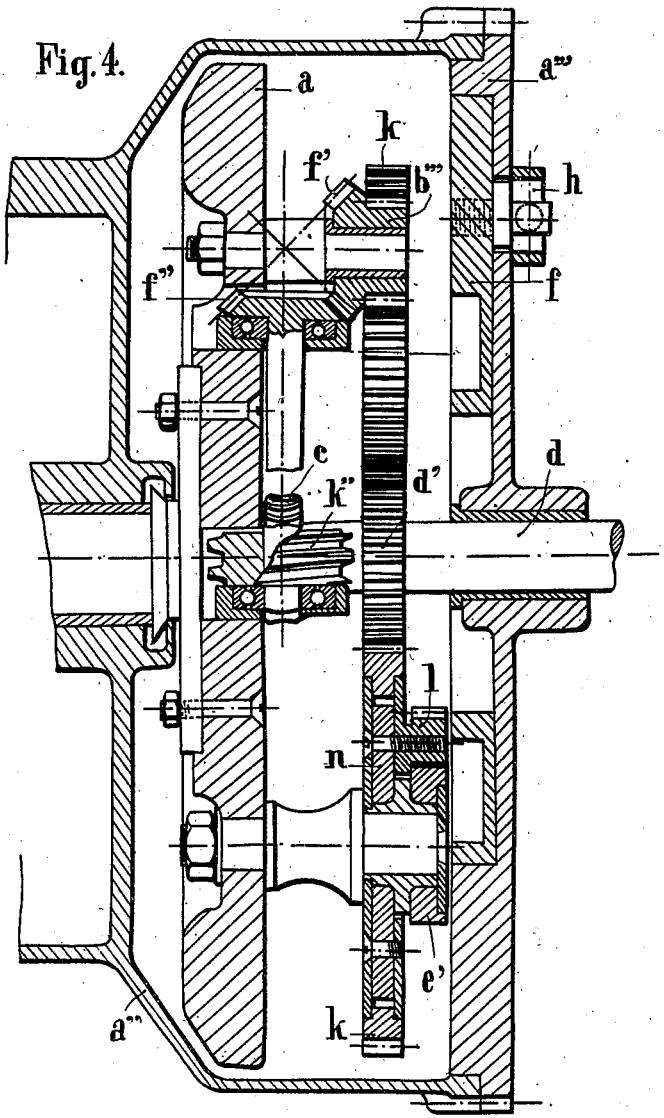

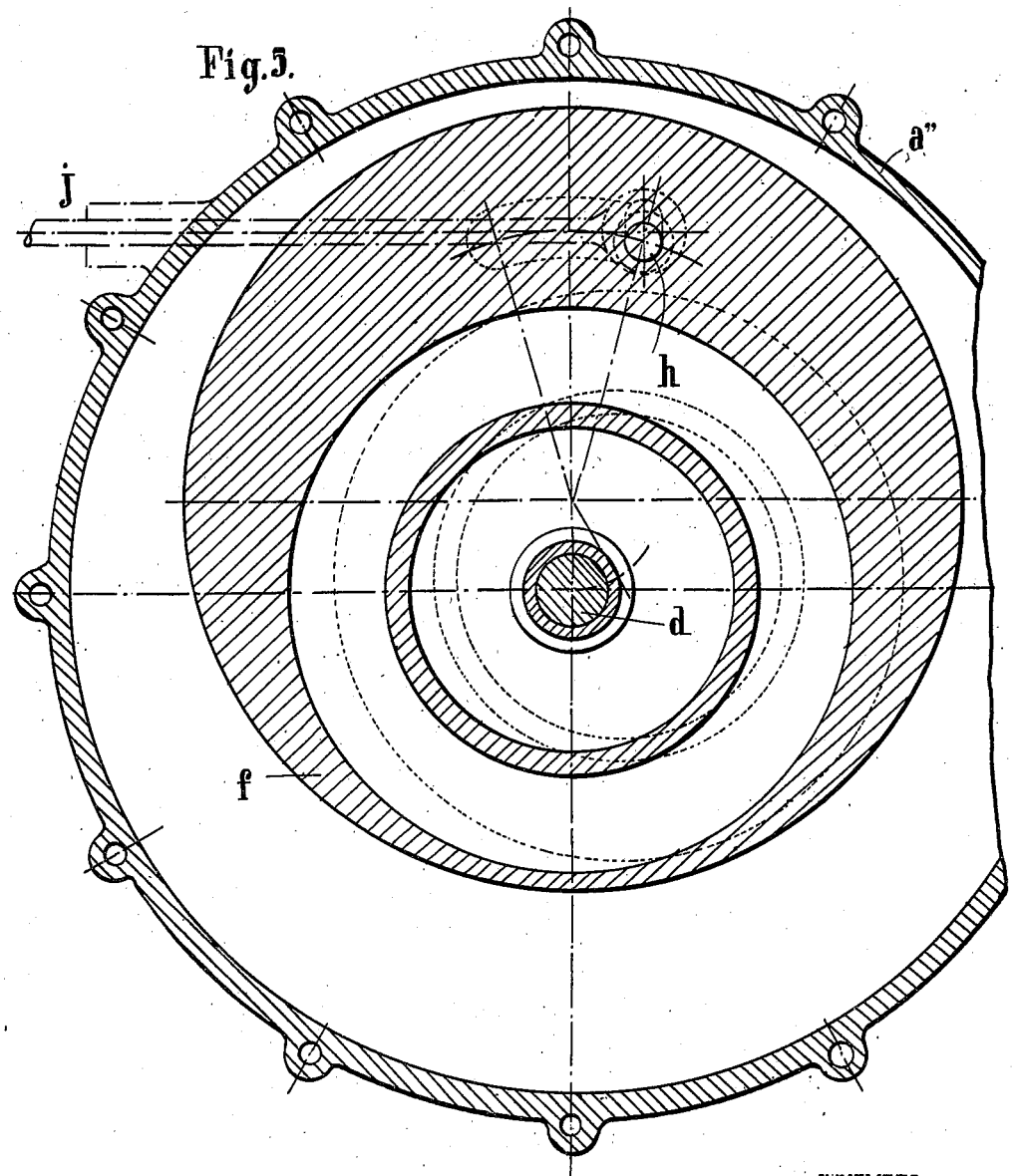

1,450,594

UNITED STATES PATENT OFFICE.

CHARLES EDOUARD HENRIOD, OF CHANELAZ-AREUSE, NEUCHATEL, SWITZERLAND.

PROGRESSIVE CHANGE-SPEED GEAR.

Application filed November 16, 1920. Serial No. 424,534.

*To all whom it may concern:*

Be it known that I, CHARLES EDOUARD HENRIOD, a citizen of the Republic of Switzerland, and resident of Chanelaz - Areuse, Neuchatel, Switzerland, have invented new and useful Improvements in Progressive Change-Speed Gears, which improvements are fully set forth in the following specification.

The present invention has for its object improvements applied to progressive change speed gears specially combined with the flywheel of a motor. These improvements relate to the use (a) of helicoidal or worm gears as the non-reversible gearing between the operating members and those to be operated in a progressive change speed gear enclosed or attached in a motor flywheel.

(b) of operating members comprising levers which transmit a regular movement, owing to the intervention of elliptical gears and sectors to free wheels mounted centrally of the flywheel, which wheels, in their turn, transmit their movement to the central member to be driven through the medium of a non-reversible connection in the nature of an endless screw, worm or helicoidal gear.

The operating levers are mounted to travel in the circular groove formed in a rotatable disk or plate which may be turned so as to dispose said groove either concentric with the axis of the motor flywheel or more or less eccentric relatively to the said axis. When the groove is concentric, the levers cannot acquire any movement, but if on the contrary the groove is eccentric, there is produced a regular forward and backward or oscillating movement of the successive levers.

The accompanying drawings represent by way of example two constructional forms of the improved change speed gear forming the subject matter of this invention.

Figure 1 is a front elevation of a motor flywheel carrying the change speed mechanism with transmission by a helicoidal gear and free wheels at the centre.

Figure 2 is a transverse section of the arrangement shown in Figure 1.

Figure 3 is a front elevation of a modification in which the free wheels are arranged as planetary devices, permitting the space occupied to be reduced. In this case the free wheels are adapted to be subjected to a double locking or grip; by rollers for example.

Figure 4 is a transverse section corresponding to Figure 3 and showing the arrangement enclosed in a fixed casing, the section being taken through the axis of the transmission shaft. The fixed casing carries a grooved plate which is adapted to be turned for the purpose of adjusting the position of the groove relative to the driven shaft.

Figure 5 is a front elevation of the grooved plate with its driving rod which may be attached to any elastic device of a suitable kind such as a pneumatic or hydraulic or spring piston, etc.

In Figs. 1 and 2, *a* indicates the flywheel, and *a'* its central, inwardly-projecting hub, the latter fitting loosely over the central shaft *d* which is the shaft to be driven or locked and which has secured to it the resistance gear *c*. A helicoidal gear *b'* is loosely mounted on hub *a'* and carries on its own hub a set of free wheels *k'*, each connectible thereto by a ball clutch or the like, so that when any one of said clutches is closed, the corresponding free wheel will be coupled to gear *b'* for rotation together. Each free wheel is provided with a set of gear teeth or gear ring *k* in mesh with, and adapted to be driven by, a sector *l'* fixed to a rock shaft *l''* which also carries an elliptical sector *l*; the last-named sector meshing with, and being actuated by, the toothed end of a centrally-pivoted lever *e'*. The other end of each lever *e'* carries a roller designed to travel in an annular groove formed in a disk *f* which is eccentrically mounted on a shaft *h*; this shaft having associated with it an adjusting device, indicated at *j, j'*, by means of which said shaft may be turned so as to move disk *f* into or out of a position in which its aforesaid groove is concentric with the driven shaft *d*. The shafts *h* and *d* extend through the tubular portion of a fixed support $i$, around which portion the flywheel $a$ rotates, as will be understood from Fig. 2.

Between the central helicoidal gear $b'$ and the resistance gear $c$ there is interposed a planetary transmission connection comprising a double gear, one part or member $f'$ of which meshes with gear $c$, while the other member $b'''$, which is helically toothed, meshes with a helicoidal gear $k^3$ on the adjacent end of a shaft $k^4$ journaled in bearings in the flywheel. This shaft $k^4$ also carries a second helicoidal gear $k''$ which meshes with gear $b'$; and under normal conditions, said gears $b'$ and $k''$ function as a non-reversible lock which prevents the planetary gear $f'$—$b'''$ from turning about its axis during its bodily movement with the flywheel, it being understood that the shaft on which said planetary gear is rotatably mounted is suitably fastened to the wall of the flywheel. Under certain other conditions, however, as hereinafter explained, the rotation of gear $b'$ will be transmitted through gears $k''$ and $k^3$ and their shaft $k^4$ to the gear $b'''$, and the latter and its connected gear $f'$ will be caused to rotate about their axes while being carried around bodily by the flywheel; the gear $c$ being driven in either case by the gear $f'$ during its bodily movement.

The closing of the ball clutches necessary to couple the free wheels $k'$ to the hub of gear $b'$ in order to effect the rotation of said gear, is effected by the adjustment of disk $f$. In the normal position of said disk, in which its groove is concentric with shaft $d$, the rollers on the operating levers $e'$ travel idly in said groove during the rotation of the flywheel without producing any rocking movement or displacement of said levers. Consequently, the sectors $l'$ and their shafts $l''$ likewise travel around idly with the flywheel, and said sectors cause the toothed free wheels $k'$ to revolve loosely on the hub of gear $b'$, thereby keeping all of the clutches open. The result is, that gear $b'$ remains stationary relative to gear $k''$ and, in conjunction with the latter, serves to lock the planetary gear against axial rotation, as already explained. Assuming, then, that the flywheel is rotating at a constant speed, the member $f'$ of the planetary gear will positively drive gear $c$ and shaft $d$ at the same speed as the flywheel in relation to the motor shaft.

In order to reduce the speed of shaft $d$, and even to stop it, it is only necessary to operate the adjusting device $j$—$j'$ to bring the groove in disk $f$ into eccentric position. When this has been done, the operating levers $e'$ will no longer remain relatively stationary during the rotation of the flywheel, but will be rocked back and forth in succession. During such oscillation, each lever will rock the corresponding bell crank formed by the sectors $l$ and $l'$ and their shaft $l''$ first in one direction and then in the other; and at each forward movement thereof, the sector $l'$ will turn the gear $k$ on the associated free wheel $k'$. As soon as this turning movement commences, the ball clutch carried by that wheel will be closed, thereby coupling said wheel to the helical gear $b'$ so that the two rotate together until the flywheel has continued its rotation far enough to swing the lever backward, whereupon the clutch is re-opened and the free wheel uncoupled from gear $b'$. During the time that the toothed free wheel is being turned by sector $l'$ and the clutch is closed, the rotary movement of gear $b'$ is transmitted through the train $k''$, $k^4$, $k^3$ to the member $b'''$ of the compound planetary gear, which latter is thereby caused to turn about its axis; and while this axial movement is taking place, the planetary gear is, of course, being carried around with the flywheel, the result being that said gear rolls idly around the periphery of the resistance gear and does not turn it. Lost motion thus occurs in the drive, and the speed of shaft $d$ tends to slow down; the positive drive being resumed as soon as the operating lever is rocked backward and thereby opens the clutch. This cycle of movement occurs for each operating lever in succession during each revolution of the flywheel; and by adjusting the eccentricity of the groove in the controlling disk $f$, the extent of the periods of lost motion may be correspondingly varied, and if carried out far enough, the rotation of shaft $d$ will no longer take place; but if the eccentricity be increased beyond such point, then the planetary gear will be rotated at a speed which will produce a backward rotation of the resistance gear $c$ and its carrier shaft $d$.

In the modification or development illustrated in Figs. 3, 4 and 5, the same reference characters are employed wherever possible to indicate the same, or corresponding, parts as in Figs. 1 and 2. Thus, $a$ indicates the flywheel, $d$ the driven shaft, $c$ the resistance gear thereon, $f$ the grooved controller plate, $h$—$j$ its adjusting device, $l$ the elliptical sectors, and $k$ the ring gears with which they mesh, the movement of the sectors being effected by the oscillation of the operating levers $e'$ controlled as before by regulating the eccentricity of disk $f$. The flywheel $a$ is disposed within a fixed casing $a''$, having a revoluble front wall or member $a'''$ (Fig. 4) to which the disk $f$ is suitably secured; and it is by rotating this wall or member by means of the device $h$—$j$ that the eccentricity-adjustment of said disk is effected. The oscillation of the levers $e'$ causes their toothed ends to rock the sectors $l$, which are rigidly connected to the free wheels $n$, so that the latter are turned to close the ball clutches with which they are provided and which serve to couple them to the gears *k*; and to increase the gripping action, each free wheel *n* is provided with a semi-circular socket in which is fitted a rocker *o* (Fig. 3) having a tail which projects into an extension of said socket large enough to enable said tail to move in either direction, as indicated by the arrows *z—z'*. This rocker *o* carries clutch rollers *s* and *u*, designed to frictionally engage the inner surface of gear *k* under certain conditions, as hereinafter explained; but under normal conditions, the rocker occupies a neutral position, as indicated by line *m—m* (Fig. 3), in which the clutch rollers are disengaged, thus leaving the gear *k* free to rotate.

The gears *k* are in mesh with a central equalizing gear *d'*, which is loose on the driven shaft *d*; and said gears *k* are also in mesh with the members *b'''* of the transmission connections, two of which are employed for balancing purposes in the construction illustrated, although there may be a single one only, or, if preferred, there may be four, one for each gear *k*. The other member *f'* of the transmission device (both members *b'''* and *f'* being bevel gears in this instance, instead of helicoidal gears) meshes with a bevel gear *f''* mounted on one end of a shaft which has secured to its other end a helicoidal gear or worm *k''* in mesh with the resistance gear *c*. Both the transmission device or devices and the shaft or shafts carrying the gears *f''* and *k''* are connected to the flywheel to be carried around bodily with the same during its movement, as in the first construction; the connected gears *f''* and *k''* constituting the planetary gearing.

Assuming that the flywheel is rotating at a constant speed, and that the groove in plate *f* is concentric with the driven shaft *d*, the operation is substantially the same as before, that is to say: the operating levers *e'* and segments *l* are relatively stationary, the ball clutches between the free wheels *n* and their gears *k* are open, the said gears *k* and the compound gear or gears *f'—b'''* lock the gears *f''* and *k''* against rotation about their axes, and there is a direct and positive drive from the flywheel through the helicoidal gear or gears *k''* to the resistance gear *c* and its shaft *d*.

When it is desired to reduce the speed of shaft *d*, the operating rod *j* (Fig. 5) of the device *j—h* is actuated to turn plate *a'''* so as to bring the groove in disk *f* into eccentric position relative to shaft *d*, thereby entailing the oscillation of the levers *e'* and the consequent operation of the gear sectors *l* of the successive free wheels *n*, to close the associated clutches. Supposing that the flywheel is rotating in the direction of arrow *t* (Fig. 3), then each free wheel as it is brought into action, will be turned in the direction of arrow *z*, and its clutch rocker will be moved into the clutch-closing position indicated by line *m—m*. The rotation of the free wheel and its coupled gear is thus transmitted to the compound gear *b'''—f'*, due to the engagement of gears *k* and *b'''*, and thence through the gear *f''* and its carrier shaft to the gear or worm *k''*, which is thereby rotated about its axis, thus effecting the requisite periods of lost motion, as in the first form. When the backward or return movement of the operating lever takes place, the corresponding movement of the associated sector *l* and free wheel *n* immediately opens the ball clutch between the latter and its gear *k* and, at the same time, turns the rocker *o* into the inactive position indicated by line *r—r* (Fig. 3), in which the clutch rollers *s* and *u* are released from gear *k*, thus completely uncoupling said gear and free wheel.

I claim as my invention:—

1. In a progressive change-speed mechanism, the combination of a motor flywheel adapted to turn at the speed of the motor; a driven shaft disposed in line with the axis of the flywheel, but independent thereof; a resistance gear on said shaft; a planetary gear carried by the flywheel to revolve bodily therewith and constantly meshing with the resistance gear; a transmission device connected with the planetary gear to normally hold it against axial rotation during its movement with the flywheel, to enable it to positively drive said resistance gear at the same speed as the flywheel; a set of normally-inactive free wheels associated with the transmission device to rotate the same; and a variable-movement device settable to render the free wheels active in succession for movements of different extents, thereby to rotate the planetary gear idly about its axis through corresponding angular distances and thus produce lost motion between it and the resistance gear, with consequent reduction of speed.

2. In a progressive change-speed mechanism, the combination of a motor flywheel adapted to turn at the speed of the motor; a driven shaft disposed in line with the axis of the flywheel, but independent thereof; a resistance gear on said shaft; a pair of gears carried by the flywheel to revolve bodily planetwise therewith, said gears being rigidly connected to rotate as a unit, and one of them constantly meshing with the resistance gear; a transmission device connected with the other planetary gear to normally hold both gears against axial rotation during their movement with the flywheel, to enable the first-named planetary gear to positively drive said resistance gear at the same speed as the flywheel; a set of normally-inactive free wheels associated with the transmission device to rotate the same; and a variable-movement device settable to render the free wheels active in succession for movements of different extents, thereby to rotate the planetary gears idly about their axes through corresponding angular distances and thus produce lost motion between the first-named planetary gear and the resistance gear, with consequent reduction of speed.

3. A progressive change-speed device, according to claim 1, in which the variable-movement device comprises a movable disk provided with an annular groove, said disk shiftable to bring its groove into and out of eccentric relation to the driven shaft and to adjust the extent of eccentricity, a set of operating levers, one for each free wheel, carried by the flywheel to move therewith and having parts adapted to travel in said groove to effect an oscillation of said levers proportional to the eccentricity of the groove, means for coupling the free wheels to the transmission device, and gearing between the levers and the free wheels to rotate the latter and thereby operate the coupling means.

4. In a progressive change-speed device, the combination of a motor flywheel adapted to turn at the speed of the motor; a central hub on the flywheel; a driven shaft independent of the flywheel; a resistance gear on said shaft; a helicoidal gear loosely mounted on the hub of the flywheel; a set of free wheels loosely mounted on the hub of the helicoidal gear; a compound planetary gear having its axis fixed to the flywheel, one member of the planetary gear constantly meshing with the resistance gear; a non-reversible connection between the helicoidal gear and the other member of the planetary gear; and a device for coupling each free wheel to the helicoidal gear for movements of variable amplitude.

5. In a progressive change-speed device, the combination of a motor fly wheel adapted to turn at the speed of the motor; a central hub on the fly wheel; a driven shaft independent of the flywheel; a resistance gear on said shaft; a helicoidal gear loosely mounted on the hub of the flywheel; a set of free wheels loosely mounted on the hub of the helicoidal gear; a planetary gear having its axis fixed to the flywheel, said planetary gear constantly meshing with the resistance gear; a shaft carried by the flywheel; a helicoidal gear mounted on said shaft and meshing with the first-named helicoidal gear; a second gear also mounted on said shaft and meshing with the planetary gear; and a movable transmission device for each free wheel to couple the same to the first-named helicoidal gear, said device having a variable amplitude of movement.

6. In a progressive change-speed device, the combination of a motor flywheel adapted to turn at the speed of the motor; a central hub on the flywheel; a driven shaft independent of the flywheel; a resistance gear on said shaft; a helicoidal gear loosely mounted on the hub of the flywheel; a set of toothed free wheels loosely mounted on the hub of the helicoidal gear; a planetary gear constantly meshing with the resistance gear and having its axis fixed to the flywheel; a non-reversible transmission connection between the helicoidal gear and the planetary gear; a member provided with a trackway, said member being shiftable to bring the trackway into eccentric position with relation to the driven shaft; rollers adapted to travel in said trackway; oscillating levers carrying said rollers; elliptical gear sectors carried by the flywheel and meshing with teeth on said levers; coupling means between the free wheels and the helicoidal gear; and gear sectors actuated by said elliptical sectors, the second-named sectors meshing with the teeth on the free wheels to rotate the latter and thereby operate the coupling means.

7. In a progressive change-speed mechanism, the combination of a rotary driving element; a driven shaft disposed in line with the axis of said element, but independent thereof; a resistance gear on said shaft; a planet gear carried by the driving element to revolve bodily therewith and constantly meshing with the resistance gear; a locking train leading to the planet gear for holding the same against axial rotation during its revolution with the driving element, to enable said planet gear to positively drive the resistance gear at the same speed as the driving element; and a device settable to turn one element of the locking train through different angular distances during the rotation of the driving element and thereby cause the said train to rotate the planet gear idly about its axis through corresponding distances, so as to produce lost motion between the planet gear and the resistance gear, with consequent reduction of speed.

8. In a progressive change-speed mechanism, the combination of a rotary driving element; a driven shaft disposed in line with the axis of said element, but independent thereof; a resistance gear on said shaft; a planet gear carried by the driving element to revolve bodily therewith and constantly meshing with the resistance gear; toothed gearing leading to the planet gear for normally holding the same against axial rotation during its revolution with the driving element, to enable said planet gear to positively drive the resistance gear at the same speed as the driving element; and a device settable to rotate one element of said toothed gearing through different angular distances during the rotation of the driving element and thereby cause said toothed gearing to rotate the planet gear idly about its axis through corresponding distances, so as to produce lost motion between the planet gear and the resistance gear, with consequent reduction of speed.

In testimony whereof I have signed this specification in the presence of two subscribing witnesses.

CHARLES EDOUARD HENRIOD.

Witnesses:
 AKIMER LANSANNE,
 L. BLANCHARD.